(12) United States Patent
Leventhal et al.

(10) Patent No.: US 8,244,935 B2
(45) Date of Patent: Aug. 14, 2012

(54) WRITE AGGREGATION USING OPTIONAL I/O REQUESTS

(75) Inventors: Adam H. Leventhal, San Francisco, CA (US); Jeffrey S. Bonwick, Los Altos, CA (US)

(73) Assignee: Oracle International Corporation, Redwood City, CA (US)

( * ) Notice: Subject to any disclaimer, the term of this patent is extended or adjusted under 35 U.S.C. 154(b) by 139 days.

(21) Appl. No.: 12/823,807

(22) Filed: Jun. 25, 2010

(65) Prior Publication Data

US 2011/0320649 A1 Dec. 29, 2011

(51) Int. Cl.
*G06F 3/00* (2006.01)

(52) U.S. Cl. .............. 710/39; 710/5; 710/20; 710/30; 711/100; 711/112; 711/113; 711/114; 369/47.14

(58) Field of Classification Search .......... None
See application file for complete search history.

(56) References Cited

U.S. PATENT DOCUMENTS

| | | | | |
|---|---|---|---|---|
| 5,954,801 A * | 9/1999 | Sokolov | .......... | 710/5 |
| 6,029,226 A * | 2/2000 | Ellis et al. | .......... | 711/100 |
| 6,092,149 A * | 7/2000 | Hicken et al. | .......... | 711/113 |
| 6,385,148 B2 * | 5/2002 | Ito et al. | .......... | 369/47.14 |
| 7,043,610 B2 * | 5/2006 | Horn et al. | .......... | 711/144 |
| 7,260,703 B1 * | 8/2007 | Moore et al. | .......... | 711/203 |
| 7,334,081 B2 * | 2/2008 | Espeseth et al. | .......... | 711/112 |
| 7,421,451 B2 * | 9/2008 | Albert et al. | .......... | 1/1 |
| 7,526,605 B2 * | 4/2009 | Espeseth et al. | .......... | 711/112 |
| 7,603,530 B1 * | 10/2009 | Liikanen et al. | .......... | 711/162 |
| 7,617,358 B1 * | 11/2009 | Liikanen et al. | .......... | 711/112 |
| 7,620,772 B1 * | 11/2009 | Liikanen et al. | .......... | 711/112 |
| 7,653,847 B1 * | 1/2010 | Liikanen et al. | .......... | 714/723 |
| 7,685,360 B1 * | 3/2010 | Brunnett et al. | .......... | 711/112 |
| 7,752,491 B1 * | 7/2010 | Liikanen et al. | .......... | 714/6.13 |
| 7,916,421 B1 * | 3/2011 | Liikanen et al. | .......... | 360/77.01 |
| 2004/0057363 A1 * | 3/2004 | Tsukihashi et al. | .......... | 369/53.22 |
| 2005/0120134 A1 * | 6/2005 | Hubis | .......... | 709/238 |
| 2005/0185524 A1 * | 8/2005 | Park et al. | .......... | 369/30.3 |
| 2005/0198010 A1 * | 9/2005 | Borthakur et al. | .......... | 707/3 |
| 2006/0242179 A1 * | 10/2006 | Chen et al. | .......... | 707/100 |
| 2006/0248270 A1 * | 11/2006 | Espeseth et al. | .......... | 711/112 |

(Continued)

OTHER PUBLICATIONS

"Hard Disk Bad Sector Mapping Techniques" by MJM Data Recovery Ltd, published on mjm.co.uk on Aug. 21, 2008.*

(Continued)

*Primary Examiner* — Steven Snyder
(74) *Attorney, Agent, or Firm* — Osha Liang LLP

(57) ABSTRACT

A computer readable storage medium comprising software instructions, which when executed by a processor, perform a method, the method including obtaining a first non-optional Input/Output (I/O) request from an I/O queue, determining that a second non-optional I/O request and an optional I/O request are adjacent to the first non-optional I/O request, generating a new data payload using a first data payload from the first non-optional I/O request, a second data payload for the second non-optional I/O request, and a third data payload corresponding to the optional I/O request, wherein the third data payload is interposed between the first data payload and the second data payload, generating a new non-optional I/O request comprising the new data payload, and issuing the new non-optional I/O request to a storage pool, wherein the new data payload is written to a contiguous storage location in the storage pool.

17 Claims, 8 Drawing Sheets

U.S. PATENT DOCUMENTS

| | | | |
|---|---|---|---|
| 2008/0198732 A1* | 8/2008 | Maeda et al. | 369/275.3 |
| 2009/0129221 A1* | 5/2009 | Park | 369/47.15 |
| 2009/0198885 A1* | 8/2009 | Manoj | 711/114 |
| 2011/0289261 A1* | 11/2011 | Candelaria | 711/103 |

OTHER PUBLICATIONS

'Bad Blocks Definition' by The Linux Information Project (LINFO), copyright 2005.*

* cited by examiner

WRITE AGGREGATION USING OPTIONAL I/O REQUESTS

BACKGROUND

With modern disk drives, there is a large performance (approx. 100:1 ratio) difference between issuing Input/Output (I/O) requests in a sequential order (with respect to physical location) on disk versus issuing I/O requests in a random order. The large difference in performance is predominately the result of two sources of latency, namely seek latency and rotational delay. Seek latency corresponds to the time required for the disk drive to move a physical read/write head to the location on the disk (i.e., the area on a platter in the disk drive) and the time required to allow for fine-tuning the exact position of the read/write head (commonly referred to as "head settling"). Rotational delay occurs when the read/write head is in the proper position, but the disk drive must wait for the desired sector to rotate underneath the read/write head.

The aforementioned latencies are typically measured in milliseconds. This is a very large amount of time when compared to the time increment used to quantify processing power of processors (e.g., nanoseconds, etc.), and these delays tend to dictate the performance available to a file system given an underlying disk drive.

Modern disk drives have two common mechanisms that help to minimize the aforementioned sources of latency: tagged queuing and time-of-flight I/O scheduling. Tagged queuing allows the disk drive to accept multiple outstanding I/O requests that the disk drive may then service concurrently in any order that the disk drive chooses. Time-of-flight I/O scheduling allows the disk drive to use detailed knowledge about the disk drive geometry and other physical characteristics to potentially service other I/O requests while waiting out the rotational delay for a desired block.

For example, consider a disk drive (implementing the aforementioned mechanisms) that has just completed servicing an I/O request for block 1000. The next I/O request that needs to be serviced is block 1500, which is located on the same track as block 1000, but 270 degrees of rotation away. While the disk drive is waiting for the disk to rotate around to block 1500, the disk drive analyzes the other outstanding I/O requests and determines that blocks 250 and 2750, which are located on adjacent tracks, may be serviced while still allowing time for the read/write head to seek back to the track for block 1500 in time to read the block 1500 as it passes under the read/write head.

SUMMARY

In general, in one aspect, the invention relates to a computer readable storage medium comprising software instructions, which when executed by a processor, perform a method, the method comprising obtaining a first non-optional Input/Output (I/O) request from an I/O queue, determining that a second non-optional I/O request and an optional I/O request are adjacent to the first non-optional I/O request, generating a new data payload using a first data payload from the first non-optional I/O request, a second data payload for the second non-optional I/O request, and a third data payload corresponding to the optional I/O request, wherein the third data payload is interposed between the first data payload and the second data payload, generating a new non-optional I/O request comprising the new data payload, and issuing the new non-optional I/O request to a storage pool, wherein the new data payload is written to a contiguous storage location in the storage pool.

In general, in one aspect, the invention relates to, a system for storing data, comprising a storage pool configured to store data, an Input/Output (I/O) queue configured to store a first non-optional I/O request and an optional I/O request, a logical block address (LBA) data structure configured to store a copy of the first non-optional I/O request, a copy of the second non-optional I/O request, and a copy of the optional I/O request, a file system configured to: obtain the first non-optional Input/Output (I/O) request from the I/O queue, determine that the second non-optional I/O request and the optional I/O request are adjacent to the first non-optional I/O request, generate a new data payload using a first data payload from the first non-optional I/O request, a second data payload for the second non-optional I/O request, and a third data payload corresponding to the optional I/O request, wherein the third data payload is interposed between the first data payload and the second data payload, generate a new non-optional I/O request comprising the new data payload, and issue the new non-optional I/O request to the storage pool, wherein the new data payload is written to a contiguous storage location in the storage pool.

Other aspects of the invention will be apparent from the following description and the appended claims.

DETAILED DESCRIPTION

Figure 1:
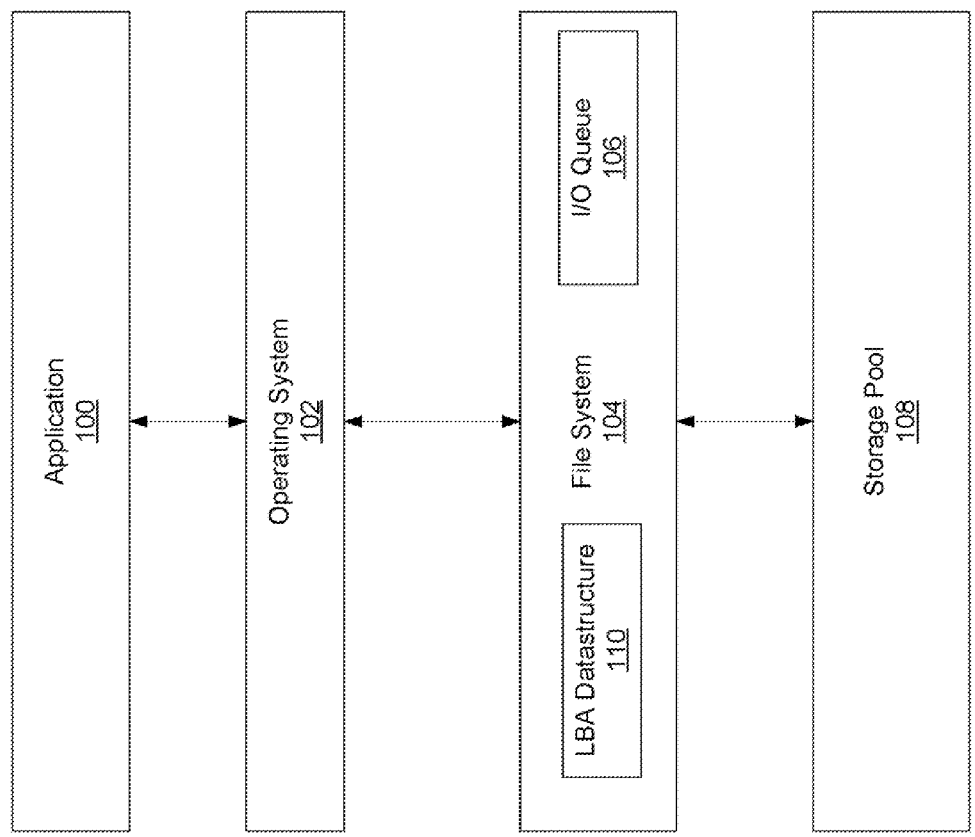
FIG. 1 shows a system architecture in accordance with one embodiment of the invention.

Exemplary embodiments of the invention will be described with reference to the accompanying drawings. Like items in the drawings are shown with the same reference numbers.

In the following description, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

In general, embodiments of the invention relate to issuing an I/O request to a storage pool using a file system I/O queue and a logical block address (LBA) data structure. Further, embodiments of the invention relate to leveraging information about empty storage locations in the storage pool to create optional I/O requests corresponding to the empty storage locations. Using this information, embodiments of the invention may coalesce multiple distinct I/O requests into a single I/O request with a larger data payload, thereby increasing the efficiency at which I/O requests are issued to disk. The reduction in number of I/O requests may increase performance of the file system. File systems implementing various embodiments of the invention have realize a performance gain of 20% with respect to the process of I/O requests.

In one embodiment of the invention, the optional I/O requests are used to bridge non-optional requests in order to coalesce multiple I/O requests into a single I/O request. For example, an optional I/O request may be used to bridge two non-optional I/O requests such that when the payloads of the three I/O requests are combined (i.e., the payloads from the two non-optional I/O requests and the payload from the optional I/O request) the result is a contiguous payload laid out, for example, in the following order: payload non-optional I/O request 1—payload optional I/O request—payload non-optional I/O request 2. Without embodiments of the invention, the two non-optional I/O requests could not be combined into a single contiguous payload and, as such, the two non-optional I/O requests would be serviced individually.

In one embodiment of the invention, each I/O request is denoted as a non-optional I/O request or an optional I/O request. In one embodiment of the invention, a non-optional I/O request corresponds to an I/O request that must be written to the storage pool in order to service the corresponding file system (FS) write request (discussed below). In one embodiment of the invention, the optional I/O request corresponds to a particular storage location in the storage pool that is intentionally not written to as part of servicing the FS write request. Storage locations that are not intentionally written to as part of servicing the FS write request may include storage locations that are used for padding (as required by the file system or by a policy implemented by the file system) or storage locations that are skipped based on a policy implemented by the file system. In other embodiments of the invention, the optional I/O requests specify storage locations where the file system is aware that the storage locations include no valid data (e.g., no data or data that may be overwritten). In one embodiment of the invention, the file system is implementing RAID, where the implementation requires the file system to skip various storage locations when servicing a FS write operation.

Those skilled in the art will appreciate that the file system does not need to generate or issue the optional I/O request in order to service the FS write request. However, those skilled in the art will appreciate that the file system may track the storage locations that are intentionally not written to as part of managing the storage pool. Further, those skilled in the art will appreciate that all FS write requests are associated with non-optional I/O requests, while not all FS write requests are associated with optional I/O requests.

The following is an example denoting the difference between non-optional and optional I/O requests. This example is not intended to limit the scope of the invention. Consider a scenario in which (i) the FS write request includes a 2K data payload to be written to the storage pool and (ii) the file system (or a policy implemented by the file system) requires 512 byte padding after the 2K data payload. In this scenario, the file system (or a process executing therein) may generate two non-optional I/O requests each with a 1K data payload, and one optional I/O request corresponding to the 512K byte padding.

Turning to the Figures, FIG. 1 shows a system architecture in accordance with one embodiment of the invention. The system architecture includes an application (100) interfacing with an operating system (102). Further, the operating system (102) includes functionality to interact with a file system (104), which in turn interfaces with a storage pool (108). The operating system (102) typically interfaces with the file system (104) via a system call interface (not shown). The operating system (102) provides operations for users to access files within the file system (104). These operations may include read, write, open, close, etc. In one embodiment of the invention, the file system (104) is an object-based file system (i.e., both data and metadata are stored as objects). More specifically, the file system (104) includes functionality to store both data and corresponding metadata in the storage pool (108). Thus, the aforementioned operations provided by the operating system (102) correspond to operations on objects.

More specifically, in one embodiment of the invention, a request (denoted as "FS request") to perform a particular operation is forwarded from the operating system (102), via the system call interface, to the file system (104). In one embodiment of the invention, the file system (104) translates the request to perform an operation on an object directly to I/O requests (non-optional and optional) to perform a read or write operations at a storage location within the storage pool (108). Further, the file system (104) includes functionality to write the data into the storage pool (108).

In one embodiment of the invention, the storage pool (108) includes one or more physical disks. Further, in one embodiment of the invention, the storage capacity of the storage pool (108) may increase and decrease dynamically as physical disks are added and removed from the storage pool.

In one embodiment of the invention, the file system (104) includes at least one I/O queue (106). Each I/O queue (e.g., I/O queue (106)) is associated with a physical disk in the storage pool (108). Each I/O queue (e.g., I/O queue (106)) typically holds the I/O requests (non-optional and optional) for a particular physical disk within the storage pool (108). Alternatively, there may be one I/O queue (106) for the entire storage pool (108) (or for a portion of the storage pool (108)). In one embodiment of the invention, the file system (104) includes functionality to order the I/O requests in each of the I/O queues (e.g., I/O queue (106)).

In one embodiment of the invention, the file system (104) may also include a Logical Block Address (LBA) data structure (110). The LBA data structure (110) includes functionality to store the I/O requests (non-optional and optional) in LBA order. In one embodiment of the invention. The LBA data structure (110) is implemented as an AVL tree. Alternatively, the LBA data structure (110) may be implemented using any other suitable data structure (e.g., an array, a linked list, a hash table, etc.) Further, the file system (104) may include functionality to insert I/O requests (non-optional and optional) into the LBA data structure (110) and functionality to retrieve I/O requests (non-optional and optional) using LBAs.

Figure 2:
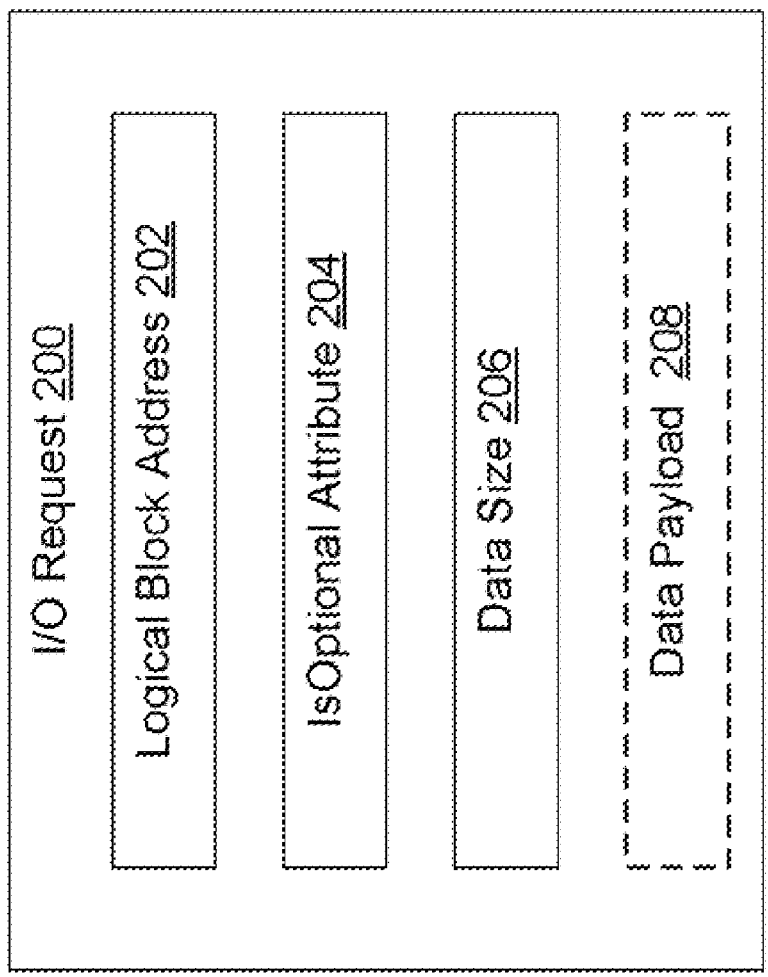
FIG. 2 shows an I/O request in accordance with one embodiment of the invention.

FIG. 2 shows an I/O request in accordance with one embodiment of the invention. The I/O request (200) includes a logical block address (LBA) (202), an IsOptional attribute (204), a data size (206), and, optionally, a data payload (208). Each of these components is described below.

In one embodiment of the invention, the LBA (202) is an n-bit value that maps to a specific storage location on the physical disk. In one embodiment of the invention, the IsOptional attribute (204) is used to specify whether the I/O request is an optional I/O request. In one embodiment of the invention, the data size (206) corresponds to the data size of the data payload (208) in the I/O request (200) if the I/O request (200) is a non-optional I/O request. Alternatively, if the I/O request is an optional I/O request (as determined by the IsOptional attribute), then the data size (206) may correspond to the size of the storage location corresponding to the optional I/O. In such cases, the I/O request may not include any data payload (208) as the data payload (208) (which corresponds to zeros) may be generated at the time the optional I/O is written to the storage pool (see FIG. 5) and, as such, does not need to be stored within the optional I/O request. In another embodiment, all I/O requests (non-optional and optional) include a data payload (208), of the size specified in the data size (206).

Figure 3:
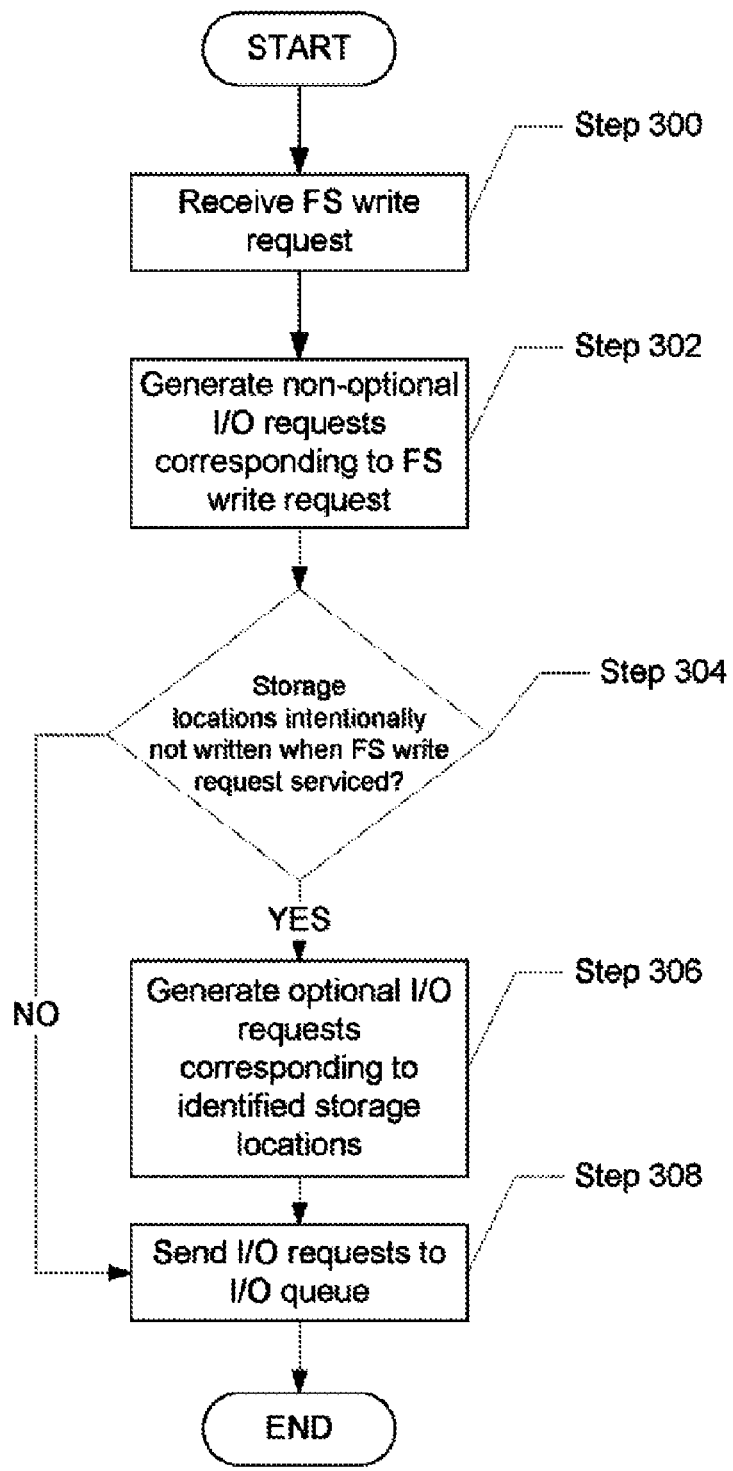
FIGS. 3-5 show flowcharts in accordance with one embodiment of the invention.
Figure 4:
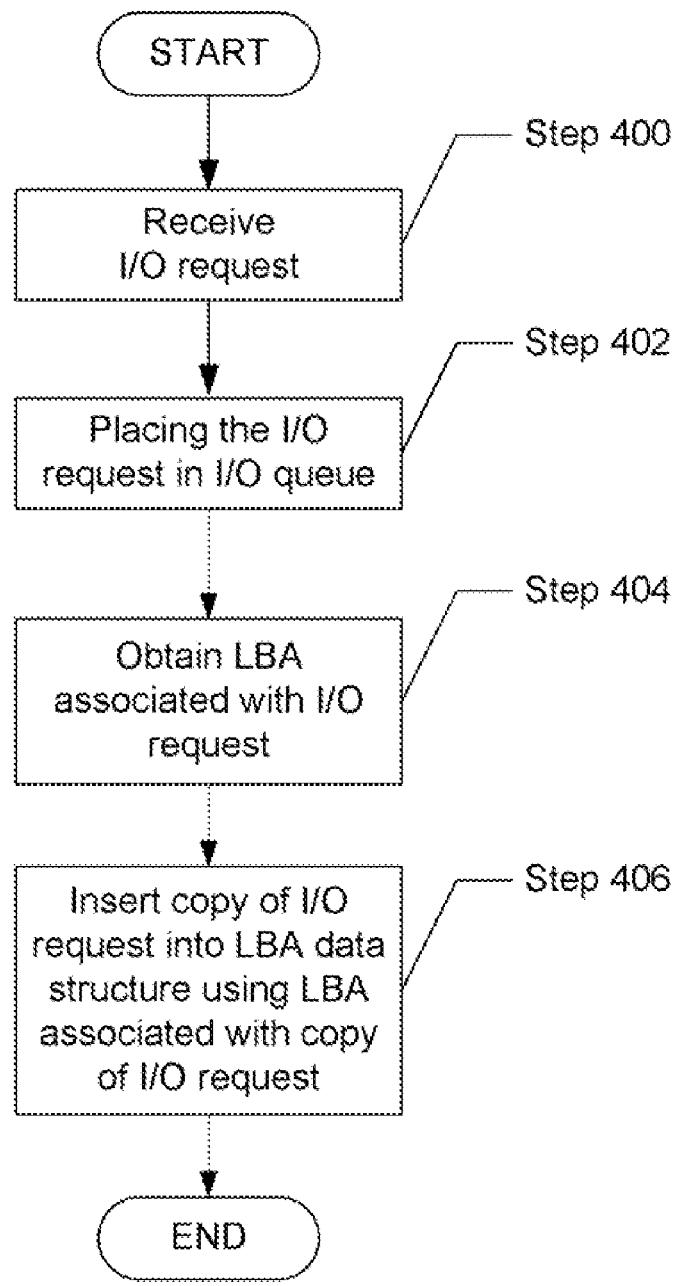
Figure 5:
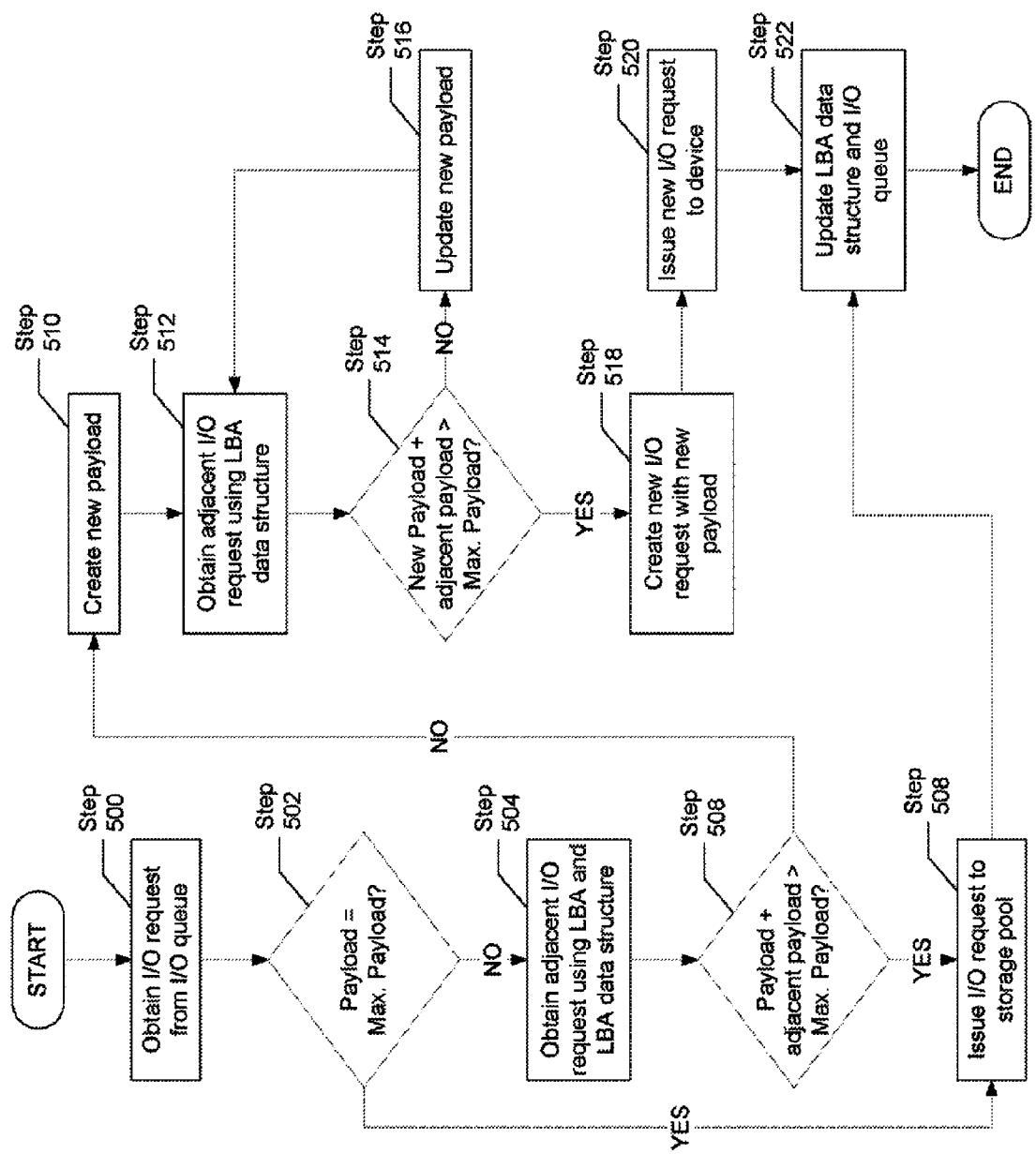

FIGS. 3, 4, and 5 show flowcharts in accordance with one embodiment of the invention. While the various steps in this flowchart are presented and described sequentially, one of ordinary skill will appreciate that some or all of the steps may be executed in different orders, may be combined, or omitted, and some or all of the steps may be executed in parallel. Further, in one or more of the embodiments of the invention, one or more of the steps described below may be omitted, repeated, and/or performed in a different order. In addition, a person of ordinary skill in the art will appreciate that additional steps, omitted in FIGS. 3-5, may be included in performing this method. Accordingly, the specific arrangement of steps shown in FIGS. 3-5 should not be construed as limiting the scope of the invention.

FIG. 3 shows a flowchart for placing generating I/O requests in accordance with one embodiment of the invention. In step 300, a FS write request is received by the file system from the operating system or an application. In step 302, one or more non-optional I/O requests corresponding to the FS write request are generated. In one embodiment of the invention, the data payload in each of the non-optional I/O requests corresponds to at least a portion of the data payload in the FS write request. In step 304, a determination is made about whether one or more storage locations in the storage pool will intentionally not be written to as part of servicing the FS write request. If one or more storage locations in the storage pool will intentionally not be written to as part of servicing the FS write request, then the process proceeds to Step 306; otherwise the process proceeds to step 308.

In step 306, one or more optional I/O requests are generated, where each optional I/O request corresponds to a storage location that will intentionally not be written to as part of servicing the FS write request. Those skilled in the art will appreciate that the data size specified in the optional I/O request cannot exceed the maximum data payload size (as defined by the file system). Accordingly, if the storage location that will intentionally not be written to is greater than the maximum data payload size, multiple optional I/O requests may be generated. For example, assume that the maximum data payload for an I/O request is 2K and the size of the storage location that will intentionally not be written to is 3K, then two optional I/O requests may be generated with the following data sizes specified: (i) first optional I/O request specifying a data size of 2K and (ii) a second optional I/O request specifying a data size of 1K. Further, Those skilled in the art will appreciate that the LBA specified in the second optional I/O request is calculated using the LBA from the first optional I/O request combined with the data size specified in the first optional I/O request. In one embodiment of the invention, the optional I/O requests generated in step 306 may not include any data payload. In step 308, all generated I/O requests (non-optional as well as optional, if generated) are issued to the I/O queue.

FIG. 4 shows a flowchart for placing an I/O request in the I/O queue and a copy of the I/O request into an LBA data structure. In step 400, an I/O request (issued in step 308) is received by a process in the file system, which manages the I/O queue and the LBA data structure. In step 402, the I/O request is placed in the I/O queue using a policy implemented by the file system (or a process executing therein). Examples of the policy may include first-in first out (FIFO), last-in first out (LIFO), priority ordering, any other policy, and/or any combination thereof. In step 404, the LBA in the I/O request is obtained. In step 406, the file system (or a related process) subsequently inserts the I/O request into the LBA data structure in the appropriate location using the LBA of the I/O request.

FIG. 5 shows a flowchart for processing the I/O request in the I/O queue in accordance with one embodiment of the invention. In step 500, the I/O request is obtained from the I/O queue. In one embodiment of the invention, the I/O request is either an optional I/O request or a non-optional I/O request and the I/O request is obtained from the front of the I/O queue.

In step 502, a determination is made about whether the size of the payload in the I/O request is equal to the maximum payload size. If the size of the payload in the I/O request is equal to the maximum payload size, then the process proceeds to Step 508; otherwise the process proceeds to Step 504.

In step 504, an adjacent I/O request (which may be an optional or non-optional I/O request) is obtained using the LBA of the I/O request and the LBA data structure. In one embodiment of the invention, the LBA of the adjacent I/O request corresponds to a storage location that is adjacent to the LBA of the I/O request, such that the payload of the I/O request may be combined with the payload of the adjacent I/O request to generate a new payload that may be written contiguously to the storage pool (See FIGS. 6A-6C).

In step 506, a determination is made about whether the size of the payload of the I/O request plus the size of the payload of the adjacent I/O request (denoted as adjacent payload) is greater than the maximum payload size. If the combined size exceeds the maximum payload size, then the process proceeds to Step 508; otherwise the process proceeds to Step 510. In step 508, the I/O request originally obtained in Step 500 is issued to the storage pool to be written at the storage location specified by the LBA in the I/O request. The process then proceeds to Step 522.

In step 510, a new payload is created, where the new payload corresponds to the payload of the I/O request plus the payload of the adjacent I/O request. In one embodiment of the invention, if either the I/O request or the adjacent I/O request is an optional I/O request that does not include a data payload, then a data payload for the optional I/O request is created in Step 510 as part of creating the new payload. In such cases, a data payload corresponding to the optional I/O request may be data specified as all zeros. Those skilled in the art will appreciate that any data may be included in the payload for the optional I/O request (as determined by the file system).

Continuing with FIG. 5, in step 512, another adjacent I/O request (which may be an optional or non-optional I/O request) is obtained using the LBA data structure and the LBAs of any I/O requests that have been combined to create the new payload (or the updated payload as described in Step 516).

In step 514, a determination is made about whether the size of the new payload plus the size of the payload of the adjacent I/O request obtained in Step 514 (denoted as adjacent payload) is greater than the maximum payload size. If the combined size exceeds the maximum payload size, then the process proceeds to Step 518; otherwise the process proceeds to Step 516. In step 516, the new payload is updated, where the updated new payload corresponds to the new payload plus the payload of the adjacent I/O request obtained in Step 514. The process then proceeds to step 512.

In step 518, a new I/O request is created that includes the new payload (generated using Steps 512, 514, and 516) as well as the LBA corresponding to where the new payload is to be written in the storage pool. In step 520, the new I/O request is issued to the storage pool to be written at the storage location specified by the LBA in the new I/O request.

In step 522, the LBA data structure and the I/O queue are updated to remove the I/O request issued in Step 508 or the I/O requests with payloads that were combined to create the new payload in the new I/O request. If the I/O queue is implemented as an AVL tree, then I/O queue is updated by rebalancing the AVL tree. The LBA data structure is updated in a similar manner.

Those skilled in the art will appreciate that methods described in FIGS. 3, 4, and 5 may occur concurrently within the system. As such, when new FS write requests are received by the file system, the file system generates and places the corresponding I/O requests (non-optional and optional) in the I/O queue and the LBA data structure, thereby reordering the I/O queue and/or the LBA data structure.

Figure 6A:
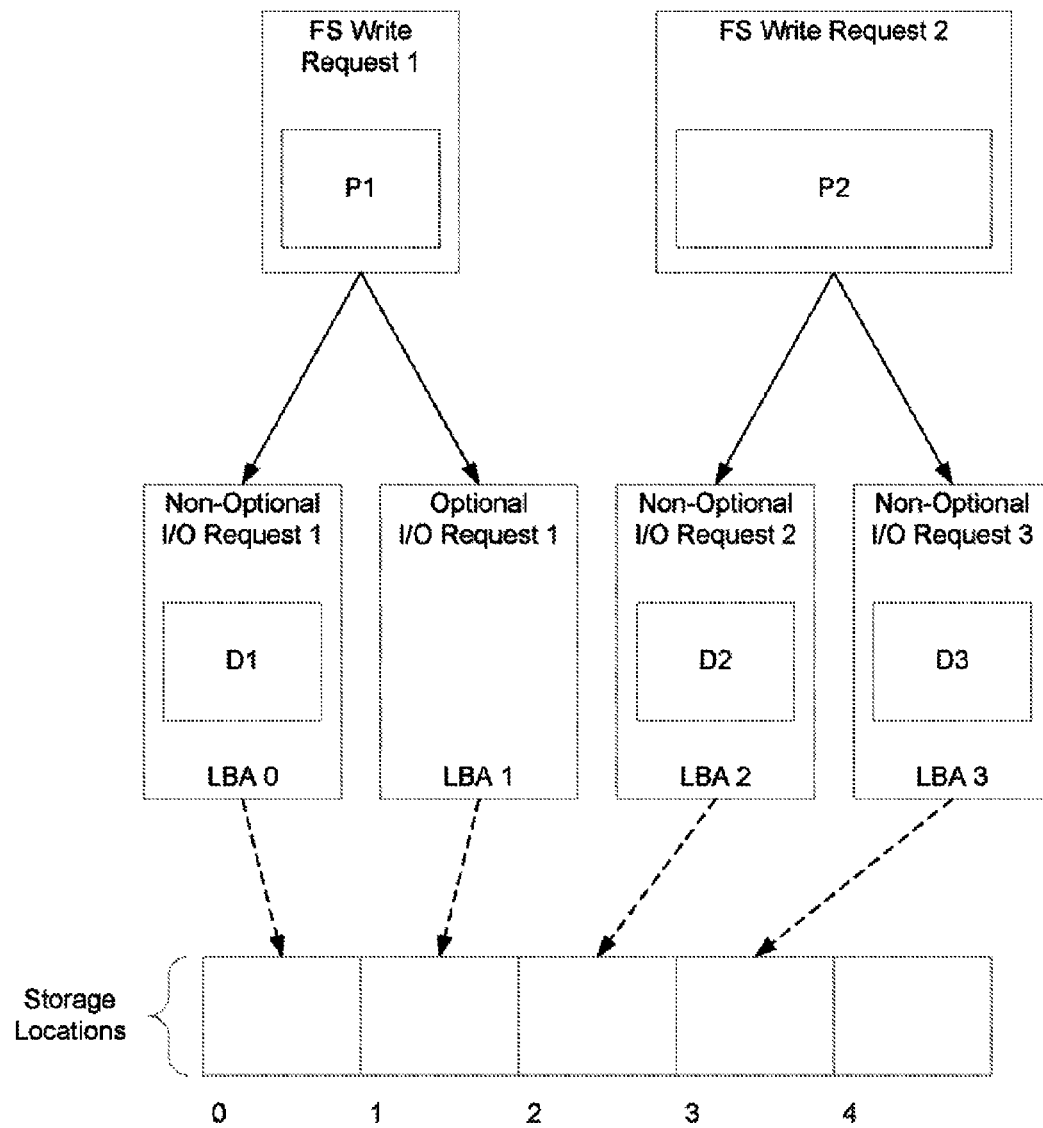
FIGS. 6A-6C show an example in accordance with one embodiment of the invention.
Figure 6B:
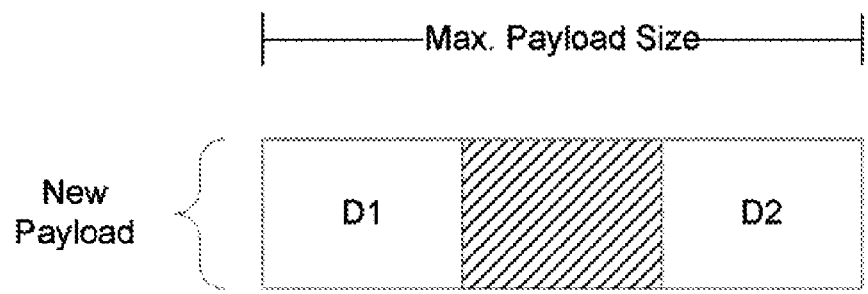
Figure 6C:
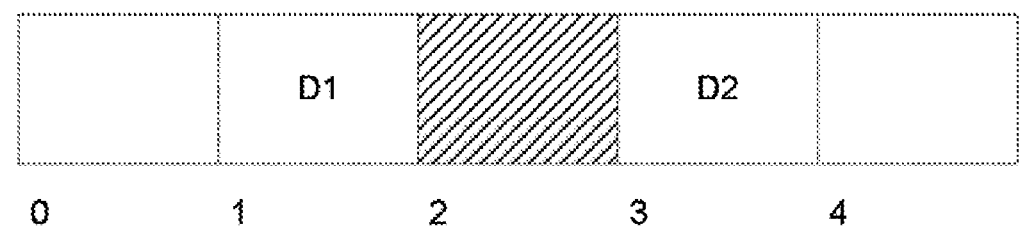

FIGS. 6A-6C show an example in accordance with one or more embodiments of the invention. The example is not intended to limit the scope of the invention.

Referring to FIG. 6A, FIG. 6A shows a contiguous portion of persistent storage in a storage pool, with storage locations 0-4 each with a 2K size. Further, with respect to the example, consider the following scenario: (i) two FS write requests are received; (ii) the FS write request 1 includes a payload—P1 of size 2K; (iii) FS write request 2 includes a payload—P2 of size 4K.

Upon receiving FS write request 1, the file system (or a process executing therein) creates the following I/O requests: (i) non-optional I/O request 1 with a payload—D1 of 2K and a LBA=0 and (ii) optional I/O request 1 with no payload and an LBA=1. D1 corresponds to P1. The optional I/O request is created based on a policy implemented by the file system, which dictates that there is at least a 2K space following D1. Upon receiving FS write request 2, the file system (or a process executing therein) creates the following I/O requests: (i) non-optional I/O request 2 with a payload—D2 of 2K and a LBA=2 and (ii) non-optional I/O request 3 with a payload—D3 of 2K and a LBA=3. D2 and D3 correspond to P2.

The aforementioned I/O requests are placed in an I/O queue (not shown). Further, though not shown in FIG. 6A, the LBA data structure includes copies of the aforementioned I/O requests organized in LBA order.

Referring to FIG. 6B, non-optional I/O request 1 is obtained from the I/O queue and a determination is made about whether the data size of I/O request 1 is greater than a maximum payload size, which, for the purposes of this example, is 6K. Because the data size of non-optional I/O request 1 is less than 6K, an adjacent I/O request is obtained using the LBA data structure. In this example, the adjacent I/O request is optional I/O request 1. Because the data size of I/O request 1 and optional I/O request 1 is 4K, which is less than the maximum payload size, a new payload is created that includes the D1 and a payload corresponding to optional I/O request 1 having a size of 2K. In this example, the payload corresponding to optional I/O request 1 is data with all zeros (as denoted by the hatched pattern in FIG. 6B).

Because the data size of the new payload is less than or equal to 6K, an adjacent I/O request is obtained using the LBA data structure. In this example, the adjacent I/O request is non-optional I/O request 2. Because the data size of the new payload and I/O request 2 is 6K, which is not greater than the maximum payload size, the new payload updated to include D2. Finally, because the data size of the new payload (as updated) is less than or equal to 6K, an another adjacent I/O request is obtained using the LBA data structure. In this example, the adjacent I/O request is non-optional I/O request 3. Because the data size of the new payload (as updated) and I/O request 3 is 8K, which greater than the maximum payload size, the new payload is not updated.

At this stage, a new I/O request is created with an LBA of 1 and the new data payload with a size of 6K. The new data payload may be written to the storage pool starting at LBA 1 as a single contiguous write. If the aforementioned I/O requests had not been coalesced then at least one additional I/O request would be required to write D2 to the storage pool.

FIG. 6C shows the result of issuing the single new I/O request to the storage pool. Once the payload in the new I/O request is issued to the storage pool, I/O request 1, I/O request 2, and optional I/O request 1 are removed from the I/O queue. Further, copies of I/O request 1, I/O request 2, and optional I/O request 1 are removed from the LBA data structure.

Figure 7:
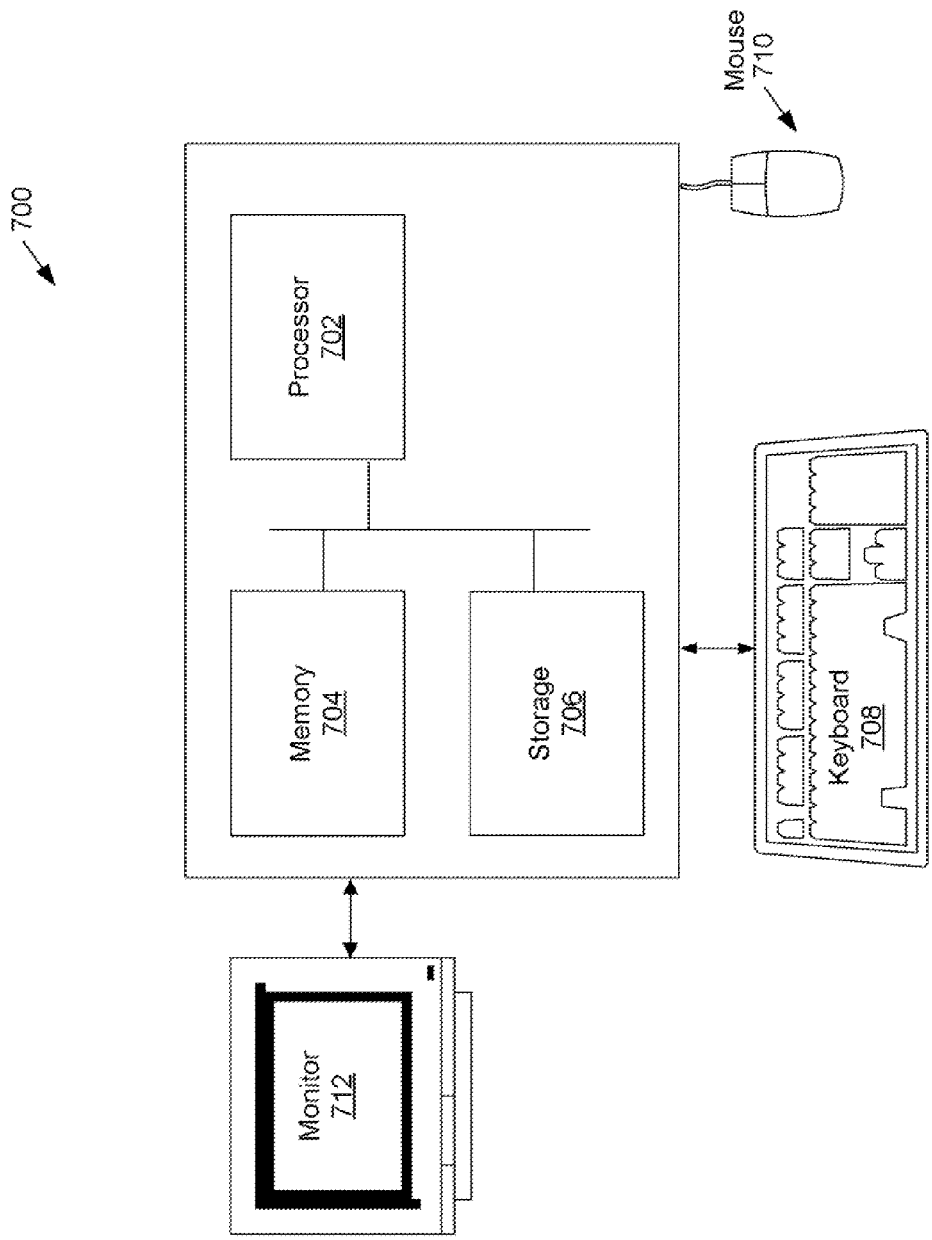
FIG. 7 shows a computer system in accordance with one embodiment of the invention.

Embodiments of the invention may be implemented on virtually any type of computer regardless of the platform being used. For example, as shown in FIG. 7, a computer system (700) includes one or more processor(s) (702), associated memory (704) (e.g., random access memory (RAM), cache memory, flash memory, etc.), a storage device (706) (e.g., a hard disk, an optical drive such as a compact disk drive or digital video disk (DVD) drive, a flash memory stick, etc.), and numerous other elements and functionalities typical of today's computers (not shown). In one or more embodiments of the invention, the processor (702) is hardware. For example, the processor may be an integrated circuit. The computer system (700) may also include input means, such as a keyboard (708), a mouse (710), or a microphone (not shown).

Further, the computer system (700) may include output means, such as a monitor (712) (e.g., a liquid crystal display (LCD), a plasma display, or cathode ray tube (CRT) monitor). The computer system (700) may be connected to a network (not shown) (e.g., a local area network (LAN), a wide area network (WAN) such as the Internet, or any other type of network) via a network interface connection (not shown). Those skilled in the art will appreciate that many different types of computer systems exist, and the aforementioned input and output means may take other forms. Generally speaking, the computer system (700) includes at least the minimal processing, input, and/or output means necessary to practice embodiments of the invention.

Further, those skilled in the art will appreciate that one or more elements of the aforementioned computer system (700) may be located at a remote location and connected to the other elements over a network. Further, embodiments of the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory. The node may alternatively correspond to a processor or micro-core of a processor with shared memory and/or resources.

Instructions to perform embodiments of the invention may be stored on a computer readable storage medium such as a compact disc (CD), a diskette, a tape, physical memory, or any other tangible computer readable storage medium that includes functionality to store instructions to perform embodiments of the invention. In one embodiment of the invention the instructions, when executed by a processor(s), are configured to perform embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A computer readable storage medium comprising software instructions, which when executed by a processor, perform a method, the method comprising:
receiving a first file system (FS) write request to store data in a storage pool;
generating a first non-optional input/output (I/O) request corresponding to the first FS write request;
placing the first non-optional I/O request in an I/O queue;
receiving a second FS write request to store data in the storage pool;
generating a second non-optional I/O request corresponding to the second FS write request;
generating an optional I/O request corresponding to the second FS write request;
placing the second non-optional I/O request and the optional I/O request in the I/O queue;
obtaining the first non-optional I/O request from the I/O queue;
making a first determination that the optional I/O request is adjacent to the first non-optional I/O request;
after the first determination, making a second determination that the second non-optional I/O request is adjacent to the optional I/O request, wherein the first non-optional I/O request is not adjacent to the second non-optional I/O request;
in response to the second determination:
generating a new data payload using a first data payload from the first non-optional I/O request, a second data payload for the second non-optional I/O request, and a third data payload corresponding to the optional I/O request, wherein the third data payload is interposed between the first data payload and the second data payload;
generating a new non-optional I/O request comprising the new data payload; and
issuing the new non-optional I/O request to the storage pool, wherein the new data payload is written to a contiguous storage location in the storage pool.

2. The computer readable storage medium of claim 1, the method further comprising:
placing a copy of the first non-optional I/O request in a logical block address (LBA) data structure using a LBA corresponding to the copy of the first non-optional I/O request.

3. The computer readable storage medium of claim 1, wherein generating the optional I/O request comprises:
making a third determination that servicing the second FS write request comprises intentionally not writing to a particular storage location in the storage pool; and
generating the optional I/O request based on the third determination, wherein a LBA specified in the optional I/O request corresponds to the particular storage location.

4. The computer readable storage medium of claim 1, the method further comprising:
updating the I/O queue after issuing the new non-optional I/O request,
wherein updating the I/O queue comprises removing the first non-optional I/O request, the second non-optional I/O request and the optional I/O request from the I/O queue.

5. The computer readable storage medium of claim 4, the method further comprising:
updating the LBA data structure after issuing the new non-optional I/O request,
wherein updating the LBA data structure comprises removing the first non-optional I/O request, the second non-optional I/O request and the optional I/O request from the LBA data structure.

6. The computer readable storage medium of claim 1, wherein determining that the second non-optional I/O request and the optional I/O request are adjacent to the first non-optional I/O request, comprises using the LBA data structure to determine that the second non-optional I/O request and the optional I/O request are adjacent to the first non-optional I/O request.

7. The computer readable storage medium of claim 1, wherein the I/O queue is implemented as an Adelson-Velskii and Landis (AVL) tree.

8. The computer readable storage medium of claim 1, wherein the I/O queue is associated with the file system.

9. The computer readable storage medium of claim 1, wherein the LBA data structure is implemented as an Adelson-Velskii and Landis (AVL) tree.

10. The computer readable storage medium of claim 1, wherein the third data payload consists of zeros.

11. A system for storing data, comprising:
a storage pool configured to store data;
an Input/Output (I/O) queue configured to store a first non-optional I/O request, a second non-optional I/O request, and an optional I/O request;
a logical block address (LBA) data structure configured to store a copy of the first non-optional I/O request, a copy of the second non-optional I/O request, and a copy of the optional I/O request;
a file system configured to:
receive a first file system (FS) write request to store data in a storage pool;
generate a first non-optional input/output (I/O) request corresponding to the first FS write request;
place the first non-optional I/O request in an I/O queue;
receive a second FS write request to store data in the storage pool;
generate a second non-optional I/O request corresponding to the second FS write request;
generate an optional I/O request corresponding to the second FS write request;
place the second non-optional I/O request and the optional I/O request in the I/O queue;
obtaining the first non-optional I/O request from the I/O queue;
making a first determination that the optional I/O request is adjacent to the first non-optional I/O request;
after the first determination, making a second determination that the second non-optional I/O request is adjacent to the optional I/O request, wherein the first non-optional I/O request is not adjacent to the second non-optional I/O request;
in response to the second determination:
generate a new data payload using a first data payload from the first non-optional I/O request, a second data payload for the second non-optional I/O request, and a third data payload corresponding to the optional I/O request, wherein the third data payload is interposed between the first data payload and the second data payload,
generate a new non-optional I/O request comprising the new data payload;
and
issue the new non-optional I/O request to the storage pool, wherein the new data payload is written to a contiguous storage location in the storage pool.

12. The system of claim 11, wherein the file system is further configured to:

place the copy of the first non-optional I/O request in a logical block address (LBA) data structure using a LBA corresponding to the copy of the first non-optional I/O request.

13. The system of claim 11, wherein generating the optional I/O request comprises:

making a third determination that servicing the second FS write request comprises intentionally not writing to a particular storage location in the storage pool; and generating the optional I/O request based on the third determination, wherein a LBA specified in the optional I/O request corresponds to the particular storage location.

14. The system of claim 11, further comprising:
an application configured to issue the first FS write request.

15. The system of claim 11, wherein the I/O queue is located in the file system.

16. The computer readable medium of claim 1, wherein the optional I/O request comprises an IsOptional attribute that indicates to the FS that the optional I/O request is optional.

17. The computer readable medium of claim 1, wherein the third payload is generated after the second determination and wherein the optional I/O request does not comprise the third payload.

* * * * *

UNITED STATES PATENT AND TRADEMARK OFFICE
CERTIFICATE OF CORRECTION

PATENT NO. : 8,244,935 B2  Page 1 of 1
APPLICATION NO. : 12/823807
DATED : August 14, 2012
INVENTOR(S) : Leventhal et al.

It is certified that error appears in the above-identified patent and that said Letters Patent is hereby corrected as shown below:

On sheet 5 of 8, Below Step 504, in figure 5, line 2, Delete "508" and insert -- 506 --, therefor.

Signed and Sealed this
Sixth Day of November, 2012

David J. Kappos
*Director of the United States Patent and Trademark Office*